United States Patent
Kim et al.

(10) Patent No.: US 12,157,672 B2
(45) Date of Patent: Dec. 3, 2024

(54) METHOD FOR RECYCLING SUPERCRITICAL WASTE LIQUID GENERATED DURING PROCESS OF PRODUCING SILICA AEROGEL BLANKET

(71) Applicant: LG CHEM, LTD., Seoul (KR)

(72) Inventors: Mi Ri Kim, Daejeon (KR); Myung Eun Oh, Daejeon (KR); Kyoung Shil Oh, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 1257 days.

(21) Appl. No.: 16/652,822

(22) PCT Filed: Nov. 13, 2018

(86) PCT No.: PCT/KR2018/013849
§ 371 (c)(1),
(2) Date: Apr. 1, 2020

(87) PCT Pub. No.: WO2019/093868
PCT Pub. Date: May 16, 2019

(65) Prior Publication Data
US 2020/0231453 A1   Jul. 23, 2020

(30) Foreign Application Priority Data

Nov. 13, 2017 (KR) .................. 10-2017-0150510
Nov. 17, 2017 (KR) .................. 10-2017-0154146

(51) Int. Cl.
*C02F 1/38* (2023.01)
*C01B 33/145* (2006.01)
*C01B 33/146* (2006.01)
*C01B 33/155* (2006.01)
*C01B 33/158* (2006.01)
*C01B 33/159* (2006.01)
*C01C 1/242* (2006.01)
*C02F 1/52* (2023.01)
*F16L 59/07* (2006.01)
*C02F 101/16* (2006.01)

(52) U.S. Cl.
CPC ........ *C01B 33/1585* (2013.01); *C01B 33/145* (2013.01); *C01B 33/146* (2013.01); *C01B 33/155* (2013.01); *C01B 33/159* (2013.01); *C01C 1/242* (2013.01); *C02F 1/385* (2013.01); *C02F 1/5236* (2013.01); *F16L 59/07* (2013.01); *C02F 2101/16* (2013.01)

(58) Field of Classification Search
CPC . C01B 33/1585; C01B 33/145; C01B 33/146; C01B 33/155; C01B 33/159; C01C 1/242; C02F 1/385; C02F 1/5236; C02F 2101/16
See application file for complete search history.

(56) References Cited

U.S. PATENT DOCUMENTS

| | | | |
|---|---|---|---|
| 2004/0087670 A1* | 5/2004 | Lee ..................... | B01J 13/0091 516/99 |
| 2016/0046495 A1 | 2/2016 | Xiang | |
| 2018/0099873 A1 | 4/2018 | Kim et al. | |
| 2018/0134566 A1 | 5/2018 | Kim et al. | |
| 2018/0179073 A1* | 6/2018 | Oh ....................... | C01B 33/1585 |
| 2018/0179075 A1 | 6/2018 | Kim et al. | |
| 2018/0245102 A1* | 8/2018 | Lloyd ................... | C05B 1/02 |
| 2018/0326700 A1 | 11/2018 | Kim | |

FOREIGN PATENT DOCUMENTS

| | | | | |
|---|---|---|---|---|
| CN | 102633269 | | 8/2012 | |
| CN | 104528764 | | 4/2015 | |
| CN | 205145937 | | 4/2016 | |
| CN | 105605885 | | 5/2016 | |
| CN | 206566887 | | 10/2017 | |
| JP | S46-026108 | | 7/1971 | |
| JP | H11-335115 | | 12/1999 | |
| JP | 2004152925 | | 5/2004 | |
| JP | 2011190548 | | 9/2011 | |
| KR | 10-20020062287 | | 7/2002 | |
| KR | 10-20110126381 | | 11/2011 | |
| KR | 10-20160122634 | | 10/2016 | |
| KR | 20160122634 A | * | 10/2016 | ........... C01B 33/158 |
| KR | 10-20170086830 | | 7/2017 | |
| KR | 10-20170104956 | | 9/2017 | |
| WO | 2017-135752 | | 8/2017 | |
| WO | 2017-142243 | | 8/2017 | |

OTHER PUBLICATIONS

Murakata et al., "Control of pore size distribution of silica gel through sol-gel process using inorganic salts and surfactants as additives," J. Mat. Sci. 27:1567-1574 (1992).

\* cited by examiner

*Primary Examiner* — Hai Y Zhang
(74) *Attorney, Agent, or Firm* — BRYAN CAVE LEIGHTON PAISNER LLP

(57) ABSTRACT

Provided is a method for recycling supercritical waste liquid and a method for producing a silica aerogel blanket capable of reducing the production costs and preventing the deterioration in thermal insulation performance of a silica aerogel blanket, the method including adding sulfuric acid to supercritical waste liquid to remove ammonium ions in the form of ammonium sulfate salt, the ammonium ions which are present in the supercritical waste liquid, and reusing supercritical waste liquid from which the ammonium ions are removed.

19 Claims, 4 Drawing Sheets

METHOD FOR RECYCLING SUPERCRITICAL WASTE LIQUID GENERATED DURING PROCESS OF PRODUCING SILICA AEROGEL BLANKET

CROSS-REFERENCE TO RELATED APPLICATIONS

This application is a National Stage Application of International Application No. PCT/KR2018/013849 filed on Nov. 13, 2018, which claims the benefit of Korean Patent Application Nos. 10-2017-0150510, filed on Nov. 13, 2017, and 10-2017-0154146, filed on Nov. 17, 2017, in the Korean Intellectual Property Office, the disclosures of which are incorporated herein in their entirety by reference.

TECHNICAL FIELD

The present invention relates to a method for recycling supercritical waste liquid generated during a process of producing a silica aerogel blanket, and a method for producing a silica aerogel blanket using supercritical waste liquid recycled by the above method.

BACKGROUND

Aerogel is a highly porous material composed of nanoparticles, and has high porosity, specific surface area, and low thermal conductivity, thereby attracting attention as a thermal insulation material, a soundproofing material, and the like of high efficiency. However, since the aerogel has very low mechanical strength due to the porous structure thereof, an aerogel composite in which aerogel is bonded to a fibrous blanket by being impregnated therewith, the fibrous blanket such as an inorganic fiber or an organic fiber, both of which are conventional heat insulation fibers, has been developed. For example, a blanket containing silica aerogel using silica aerogel is prepared through steps of silica sol preparation-gelation-aging-surface modification-drying. Specifically, in a typical technology, a small amount of $NH_4OH$ is used in the aging step and hexamethyl disilazane (HMDS) is used as a surface modifier. At this time, when HMDS is decomposed into trimethyl silanol (TMS) or trimethyl ethoxy silanol (TMES), $NH_3$ is generated. Some of $NH_3$ is reacted with carbon dioxide during supercritical drying and forms ammonium carbonate salt, and some thereof remain in recycled ethanol. The supercritical drying method in an aerogel production process is described in Korean patent laid-open publication No. 2002-0062287 (Patent application No.: 10-200-004531).

Meanwhile, the aerogel blanket is not widely used in the market despite the superior thermal insulation performance thereof when compared with typical thermal insulation materials because the production cost thereof is high. Product prices of an aerogel blanket are relatively higher than those of other thermal insulation materials due to the expensive raw materials, the complex production processes, and the costs of processing a large amount of waste liquid generated during the production process thereof.

Methods of reducing costs by changing raw materials or changing production processes among the above price increase factors can directly affect the quality of products, and are thus not appropriate to be applied. The easiest way to lower costs is to reuse waste liquid generated during a production process.

However, reusing the waste liquid can cause following problems: first, the physical properties of an aerogel blanket can be deteriorated (increase in thermal conductivity) due to residual ammonia; second, it is difficult to control the gelation time of a precursor solution; and third, ammonium carbonate salt formed by reacting with carbon dioxide used for supercritical drying can block pipes of supercritical drying equipment.

Therefore, the present invention is to provide a novel method for recycling supercritical waste liquid in order to solve the above problems.

BRIEF DESCRIPTION

Technical Problem

An aspect of the present invention provides a method for producing a silica aerogel blanket, the method capable of reducing the production costs and preventing the deterioration in thermal insulation performance of a silica aerogel blanket by recycling and reusing supercritical waste liquid generated in a supercritical drying step during a process of producing a silica aerogel blanket.

Specifically, the present invention provides a method for recycling supercritical waste liquid, the method capable of forming uniform pores of a silica aerogel blanket and improving the thermal insulation performance of a silica aerogel blanket by adding sulfuric acid to remove ammonium ions present in supercritical waste liquid by precipitating the ammonium ions in the form of ammonium sulfate salt $(NH_4)_2SO_4$, thereby reusing the supercritical waste liquid.

In addition, another aspect of the present invention provides a method for recycling supercritical waste liquid, the method further including a step of applying a centrifugation process during a precipitation process to significantly shorten the precipitation time, thereby shortening the process time required for recycling and further increasing the recovery rate of recycled supercritical waste liquid.

Technical Solution

According to an aspect of the present invention, there is provided a method for recycling supercritical waste liquid, wherein sulfuric acid is added to supercritical waste liquid generated in a supercritical drying step during a process of producing a silica aerogel blanket.

According to another aspect of the present invention, there is provided a method for recycling supercritical waste liquid, the method further including performing centrifugation after adding sulfuric acid to supercritical waste liquid.

According to another aspect of the present invention, there is provided a method for producing a silica aerogel blanket, wherein supercritical waste liquid recycled by the method for recycling supercritical waste liquid is reused.

Advantageous Effects

According to a method for recycling supercritical waste liquid of the present invention, supercritical waste liquid generated during a process of producing a silica aerogel blanket is recycled and reused, so that it is possible to produce a silica aerogel blanket, the production costs of which are reduced and the deterioration in thermal insulation performance of which is prevented.

Particularly, the recycling method of the present invention the method can produce a silica aerogel blanket with improved thermal insulation performance by adding sulfuric acid to remove ammonium ions present in supercritical waste liquid in the form of ammonium sulfate salt $(NH_4)_2SO_4$, thereby forming uniform pores of aerogel when compared with other recycling methods.

In addition, the present invention can further include a step centrifugation after adding sulfuric acid to significantly shorten the precipitation time, thereby shortening the process time required for recycling and further increasing the recovery rate of recycled supercritical waste liquid.

BRIEF DESCRIPTION OF THE DRAWINGS

The following drawings attached herein illustrate preferred embodiments of the present invention by example, and serve to enable technical concepts of the present invention to be further understood together with detailed description of the invention given below, and therefore the present invention should not be interpreted only with matters in such drawings.

DETAILED DESCRIPTION

Figure 1A:
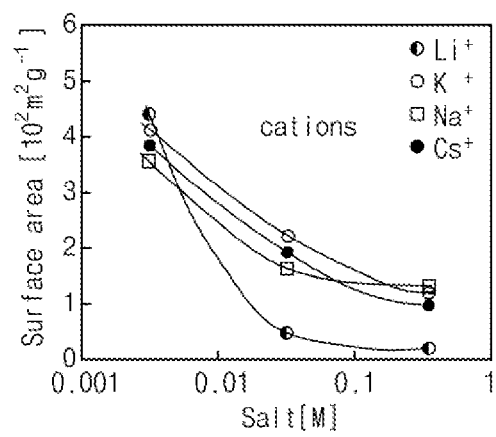
FIGS. 1A and 1B are graphs showing a change in surface area of silica aerogel according to the concentration of monovalent cations (FIG. 1A) and anions (FIG. 1B)

Hereinafter, the present invention will be described in more detail to facilitate understanding of the present invention. In this case, it will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor can properly define the meaning of the words or terms to best explain the invention.

The purpose of the present invention is to provide a method for recycling supercritical waste liquid and a method for producing a silica aerogel blanket, the methods capable of reducing the production costs and preventing the deterioration in thermal insulation performance of a silica aerogel blanket by recycling and reusing supercritical waste liquid generated after supercritical drying.

Therefore, a method for recycling supercritical waste liquid according to an embodiment of the present invention is characterized in that sulfuric acid is added to supercritical waste liquid generated in a supercritical drying step during a process of producing a silica aerogel blanket, and a method for producing a silica aerogel blanket according to an embodiment of the present invention is characterized in that he supercritical waste liquid recycled by the method for recycling supercritical waste liquid is reused.

Hereinafter, the method for recycling supercritical waste liquid and the method for producing a silica aerogel blanket of the present invention will be described in detail.

Method for Recycling Supercritical Waste Liquid

A method for recycling supercritical waste liquid according to an embodiment of the present invention is characterized by adding sulfuric acid to supercritical waste liquid generated in a supercritical drying step during a process of producing a silica aerogel blanket.

The supercritical waste liquid of the present invention refers to waste liquid generated after supercritical drying, and can comprise water, an organic solvent, and ammonium ions ($NH_4^+$). The organic solvent can be one or more selected from the group consisting of methanol, ethanol, hexane, and pentane, and more specifically, can be ethanol.

Meanwhile, the supercritical waste liquid of the present invention can be obtained by simultaneously applying a plurality of pressure pulses to a solvent contained in silica gel and supercritical fluid in the supercritical drying step.

At least two of the plurality of pressure pulses are characterized by having at least one feature of being different frequencies and being different amplitudes, so that it is possible to rapidly exchange the solvent contained in the silica gel with the supercritical fluid so as to rapidly obtain the supercritical waste fluid, thereby greatly shortening the production time of a silica aerogel blanket.

Silica aerogel which is widely used as a thermal insulation material in construction or industrial fields has a disadvantage in that when the surface thereof is not hydrophobicized, water in the air is absorbed due to the hydrophilic properties of a silanol group (Si—OH) on the surface of silica, so that the thermal conductivity is gradually increased. Also, there is a problem in that it is difficult to manufacture a super-thermal insulation product having a meso pore since it is difficult to expect a spring back phenomenon due to the intensified pore collapse in a drying process.

Therefore, in order to maintain a low thermal conductivity by suppressing the absorption of moisture in the air, a step of modifying the surface of the silica aerogel so as to be hydrophobic is essentially required. In general, silica aerogel is prepared through steps of silica precursor solution preparation-gelation-aging-surface modification-drying.

Meanwhile, a surface modifier used in the surface modification step forms ammonium ions ($NH_4^+$) during a hydrophobic process of the surface of silica aerogel. Therefore, when the supercritical waste liquid is reused as a solvent in a preparation step of silica sol without the ammonium ions ($NH_4^+$) being removed, the pH of a silica sol solution is increased by the ammonium ions ($NH_4^+$) contained in supercritical waste liquid, making it difficult to control gelation time, thereby making it impossible to produce a product having desired physical properties. Furthermore, the ammonium ions ($NH_4^+$) can block pipes of supercritical drying equipment by forming ammonium carbonate salt by reacting with carbon dioxide during supercritical drying, and some of the ammonium ions ($NH_4^+$) can remain in the supercritical waste liquid to cause problems such as increasing the thermal conductivity of a finally produced silica aerogel or silica aerogel blanket.

Therefore, in order to reduce production costs of a silica aerogel blanket and prevent the deterioration in thermal insulation performance of a product finally produced, which is the purpose of the present invention, it is essential to remove residual ammonium ions ($NH_4^+$) contained in supercritical waste liquid before reusing the supercritical waste liquid.

Specifically, the present invention is characterized by adding sulfuric acid to supercritical waste liquid generated after a supercritical drying step to recycle the waste liquid.

When the pH of the supercritical waste liquid is lowered by adding an acid such as acetic acid, hydrochloric acid or nitric acid, which is not sulfuric acid, to the supercritical waste liquid, gelation time can be controlled when the supercritical waste liquid is reused in a step of preparing silica sol, but a salt formed by a neutralization reaction of residual ammonium ions and the added acid can be dissolved in the waste liquid and still be present therein. Therefore, ammonium ions are not completely removed by such way, and the dissolved salt can interfere with the formation of uniform pores during a gelation reaction, thereby deteriorating the thermal insulation performance of a finally produced product.

Figure 1B:
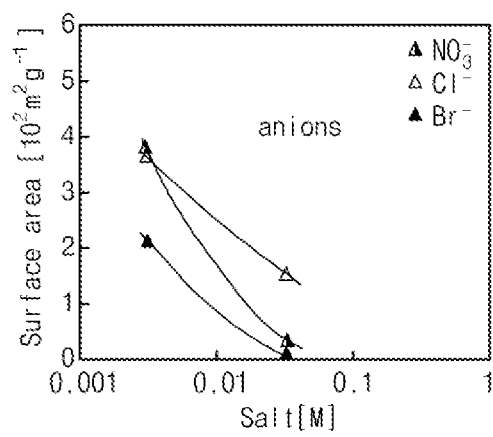
Figure 2:
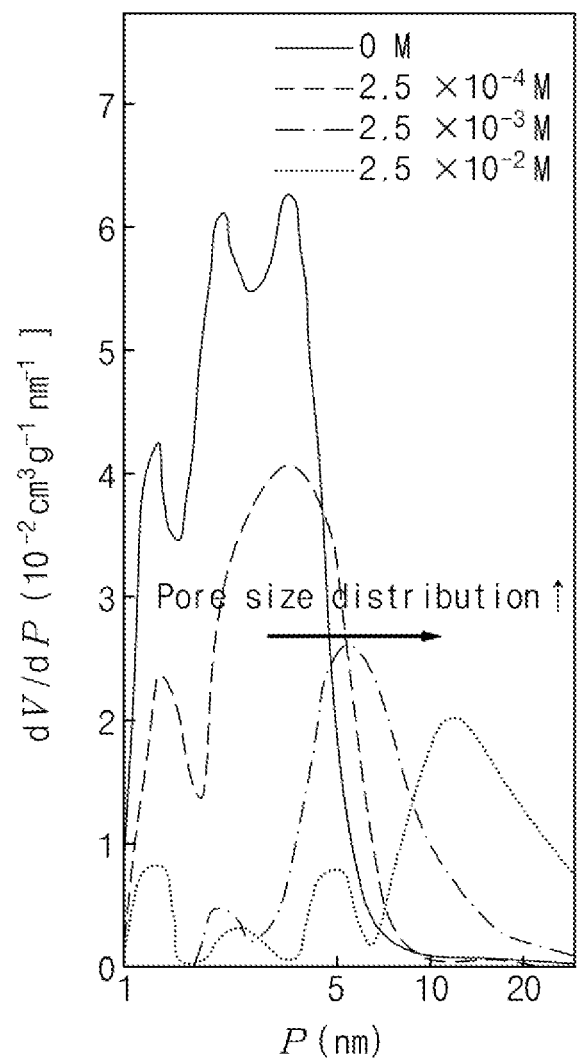
FIG. 2 is a graph showing pore size distribution of silica aerosol in accordance with the concentration of NaCl contained in silica sol.

Specifically, referring to FIGS. 1A and 1B, it can be confirmed that as the concentration of monovalent cations or anions increases, the surface area of silica aerogel is reduced. Referring to FIG. 2, it can be confirmed that as the concentration of NaCl contained in silica sol increases, the pore size distribution of the silica aerogel increases, so that uniform pores are not formed (JOURNAL OF MATERIALS SCIENCE 27 (1992) 1567-1574 "Control of pore size distribution of silica gel through sol-gel process using inorganic salts and surfactants as additives"). Particularly, it is expected that the lower the atomic number of the ions, the greater the impact (Schultze-Hardy law).

Thus, it is expected that when a salt remains in the form of ions in supercritical waste liquid, the formation of uniform mesopores can be adversely affected, so that the thermal insulation performance of a finally produced product can be deteriorated.

In the present invention, sulfuric acid is added to the supercritical waste liquid, and the sulfuric acid reacts with ammonium ions present in the supercritical waste liquid to form insoluble ammonium sulfate $(NH_4)_2SO_4$ which is not dissolved in an organic solvent, more specifically ethanol. When the salt is removed by precipitation or filtration, silica aerogel with excellent thermal insulating performance by having uniform pore size distribution is produced.

Meanwhile, the sulfuric acid of the present invention can be added such that the pH of the supercritical waste liquid is 2.5 to 9.0, more preferably 3.0 to 5.0.

When the sulfuric acid is added in an amount such that the pH of the supercritical waste liquid is less than the above range, residual ammonium ions are not completely removed so that the supercritical waste liquid may not be recycled. When added in an amount such that the pH of the supercritical waste liquid is greater than the above range, there may be problems in that the sulfuric acid is added more than what is required for the formation of ammonium sulfate so that raw material costs can be unnecessarily increased, and the pH of the supercritical waste liquid is too low so that the supercritical waste liquid may not be reused for producing silica sol.

The pH of the recycled supercritical waste liquid of the present invention added with an appropriate amount of sulfuric acid can be 2.5 to 9.0, more preferably 3.0 to 5.0.

When the pH of the recycled supercritical waste liquid is less than the above range, the gelation time can be too long or an excessive amount of gelation agent can be required. Also, the ammonium sulfate can be re-dissolved so that the content of sulfate and ammonium ions in the silica sol can be increased. When greater than the range, the gelation time is too short so that a gelation reaction occurs before silica sol being completely impregnated with a blanket base material, which can cause problems such as the loss of a silica aerogel raw material or the deterioration in the thermal insulation performance of a product finally produced.

Also, in the present invention, since an insoluble salt generation reaction by residual ammonium ions and sulfuric acid occurs immediately after the sulfuric acid is added to the supercritical waste liquid, the pH of the supercritical waste liquid added with the sulfuric acid, for example, the pH of the supercritical waste liquid immediately after the addition of the sulfuric acid can be the same as the pH of the recycled supercritical waste liquid.

In addition, according to an embodiment of the present invention, as described above, a step of precipitating and removing an insoluble salt produced by adding the sulfuric acid can be further included.

Meanwhile, in order to effectively shorten the process time of producing an aerogel blanket which is followed by the recycling process of supercritical waste liquid and to improve the recovery rate of the waste liquid, a step of performing centrifugation on the supercritical waste liquid added with the sulfuric acid and a step of obtaining supernatant liquid after the centrifugation can be further included preferably after the step of adding the sulfuric acid.

Specifically, according to an embodiment of the present invention, when the centrifugation is applied in the precipitation step, the precipitation time is significantly reduced, and the process time of the recycling can be reduced and the recovery rate of the recycled supercritical waste liquid can be further increased.

When the centrifugation process is further included, the total process time of the method for recycling supercritical waste liquid according to an embodiment of the present invention can be 10 hours or less, specifically 8 hours or less, more specifically 6 hours or less.

Also, the present invention increases the recovery rate of recycled supercritical waste liquid. The recovery rate of the recycled supercritical waste liquid of the present invention can be 80% or greater, specifically 90% or greater, more specifically 95% or greater, further more specifically 100% based on the weight of the supercritical waste liquid before the addition of the sulfuric acid.

The recovery rate of the recycled supercritical waste liquid refers to an amount of finally recycled supercritical waste liquid which is reusable by completely removing ammonia after a recycling treatment to an amount of supercritical waste liquid before the recycling treatment (that is, before the addition of sulfuric acid), and can be calculated by "Recovery rate (%) of recycled supercritical waste liquid=(weight of solution obtained after precipitating and removing insoluble salt contained in supercritical waste liquid)/(weight of supercritical waste liquid before recycling)×100," wherein the 'solution' can refer to the finally recycled supercritical waste liquid reusable by removing an insoluble salt, or can refer to supernatant liquid obtained after precipitating the insoluble salt when the centrifugation process is further included.

Meanwhile, it is preferable that the centrifugation is performed at a rate of 2000 to 3500 rpm, more specifically 3000 to 3500 rpm for 10 to 30 minutes, more specifically 10 to 20 minutes.

When the rate and/or time of the above range are satisfied, the precipitation of a salt is achieved well, so that the recovery rate of recycled supercritical waste liquid can be further improved, the physical properties of a silica aerogel blanket produced by reusing the recycled supercritical waste liquid can be further improved thereby, and an efficient process can be performed by preventing energy from being wasted unnecessarily due to excessive speed and time conditions.

Also, the method for recycling supercritical waste liquid of the present invention can further include a step of stirring the supercritical waste liquid added with the sulfuric acid before the centrifugation, and the stirring time can be 1 to 6 hours, more specifically 1 to 3 hours. In this case, the added sulfuric acid is evenly dispersed in the supercritical waste liquid, thereby facilitating the formation of ammonium sulfate salt.

When the stirring speed and/or the stirring time of the above range are satisfied, the reaction of the sulfuric acid and ammonium ions is completely achieved so that the removal rate of the ammonium ions can be significantly increased, excellent physical properties of silica aerogel blanket can be obtained when the supercritical waste liquid recycled is reused for producing a silica aerogel blanket, and an efficient process can be performed by preventing energy from being wasted unnecessarily due to excessive speed and time conditions.

Also, the method for recycling supercritical waste liquid of the present invention can further include a step of holding the supercritical waste liquid added with the sulfuric acid before the centrifugation, and the holding time can be 1 to 8 hours, more specifically 5 to 7 hours. In this case, the added sulfuric acid is evenly dispersed in the supercritical waste liquid, thereby facilitating the formation of ammonium sulfate salt.

When the holding time of the above range is satisfied, the reaction of the sulfuric acid and ammonium ions is completely achieved so that the removal rate of the ammonium ions can be significantly increased, excellent physical properties can be obtained when reused for producing a silica aerogel blanket, and an efficient process can be performed by preventing energy from being wasted unnecessarily due to excessive speed and time conditions.

Method for Preparing Silica Aerogel Blanket

A method for producing a silica aerogel blanket according to an embodiment of the present invention is characterized by reusing the recycled supercritical waste liquid in producing a silica aerogel blanket.

In the method for producing a silica aerogel blanket according to an embodiment of the present invention, the recycled supercritical waste liquid can be reused in one or more steps selected from the group consisting of a silica sol preparation step, an aging step, and a surface modification step, more specifically in a silica sol preparation step.

In addition, the method for producing a silica aerogel blanket of the present invention can further include a step of recycling aged waste liquid and surface-modified waste liquid during a process of producing the silica aerogel blanket, and reusing the same in one or more steps of the aging step and the surface modification step.

In other words, aged waste liquid and surface-modified waste liquid recycled through the aging step and the surface modification step can also be recycled so as to be reused in the production process of the next batch of silica aerogel blanket, and can be specifically reused in one or more steps of the aging step and the surface modification step. The aged waste solution and the surface-modified waste solution reused in the aging step and the surface modification step do not cause the deterioration in thermal insulation performance of the silica aerogel blanket even though a large amount of ammonium ions are included therein, and thus can be used without separate processing, thereby reducing production costs.

When supercritical waste liquid is recycled typically by adding acetic acid or hydrochloric acid, a salt formed by a neutralization reaction is dissolved and present in the recycled supercritical waste liquid even after the recycling, so that the recycling effect is not high. The amount of the recycled supercritical waste liquid reused is 80 wt % or less based on the total weight of an organic solvent used for producing a silica aerogel blanket.

However, according to the present invention, the ammonia removal efficiency is high so that the recycled supercritical waste liquid can be 85 wt % or greater, more specifically 90 wt % or greater based on the total weight of an organic solvent used for producing a silica aerogel blanket, and in the step of producing silica sol, the recycled supercritical waste liquid can be reused in an amount of 55 wt % to 100 wt %, specifically 70 to 100 wt % based on the total weight of an organic solvent used for preparing the silica sol, so that it is possible to significantly reduce production costs.

In the method for producing a silica aerogel blanket of the present invention, even when the recycled supercritical waste liquid is reused for producing a silica aerogel blanket, the thermal insulation performance thereof is not lower than the thermal insulation performance of a silica aerogel blanket produced by using only a fresh solvent. Specifically, the thermal conductivity of a silica aerogel blanket of the present invention produced by using the recycled supercritical waste liquid can be 20 mW/mK or less, more specifically 19 mW/mK or less. Also, a silica aerogel blanket of the present invention produced by reusing supercritical waste liquid recycled according to an embodiment of the present invention can have a BET surface area of 600 $m^2/g$ or greater, specifically 700 $m^2/g$ or greater, more specifically 780 $m^2/g$ or greater, an average pore size of 10 nm, and an average pore volume of 2.0 $cm^3/g$ or greater, specifically 2.5 $cm^3/g$ or greater, more specifically 2.9 $cm^3/g$.

As described above, in the present invention, supercritical waste liquid generated during a process of producing a silica aerogel blanket is recycled and reused by using sulfuric acid, so that the production costs of a silica aerogel blanket can be reduced, and the deterioration in thermal insulation performance thereof can be prevented. Furthermore, when compared with a recycling method in which another acid is added, a silica aerogel blanket with improved thermal insulation performance can be produced by forming uniform pores.

EXAMPLES

Hereinafter, examples of the present invention will be described in detail so that those skilled in the art can easily carry out the present invention. The present invention can, however, be embodied in many different forms and is not limited to the examples set forth herein.

Examples 1 to 6

A mixed solution prepared by mixing tetraethyl orthosilicate (TEOS) and ethanol at a weight ratio of 3:1 was added with a solution of hydrochloric acid diluted with water (concentration=0.15 wt %) such that the pH of the mixed solution was to be 1 and then mixed to prepare silica sol (silica content in silica sol=4 wt %). Next, the silica sol was added with an ammonia catalyst at 0.5 vol %, deposited in glass fiber, and gelled to prepare a silica wet gel composite.

The prepared silica wet gel composite was left in an ammonia solution at a temperature of 70° C. for 1 hour to be aged.

Thereafter, a surface modifier solution prepared by mixing hexamethyldisilazane and ethanol in a volume ratio of 1:19 was added to wet gel at 90 vol %, and then surface-modification was performed thereon at 70° C. for 4 hours to prepare a hydrophobic silica wet gel composite. The hydrophobic silica wet gel composite was placed in a supercritical extractor of 7.2 L and $CO_2$ was injected thereto. Thereafter, the temperature inside the extractor was raised to 60° C. over 1 hour, and supercritical drying was performed at 50° C. and 100 bar. At this time, supercritical waste liquid was recovered through a lower end of a separator.

100 g of the recovered supercritical waste liquid was added with sulfuric acid for 10 to 20 minutes such that the pH of recycled supercritical waste liquid is as shown in Table below, and left at room temperature for 12 hours to precipitate and remove an insoluble salt so as to complete the recycling of the supercritical waste liquid.

The recycled supercritical waste liquid was used as much as 85 wt % of ethanol required in producing the silica sol, and fresh ethanol to be used for the first time was used for the remaining 15 wt % to produce a silica aerogel blanket using the recycled supercritical waste liquid.

Example 7

A mixed solution prepared by mixing tetraethyl orthosilicate (TEOS) and ethanol at a weight ratio of 3:1 was added with a solution of hydrochloric acid diluted with water (concentration=0.15 wt %) such that the pH of the mixed solution was to be 1 and then mixed to prepare silica sol (silica content in silica sol=4 wt %). Next, the silica sol was added with an ammonia catalyst at 0.5 vol %, deposited in glass fiber, and gelled to prepare a silica wet gel composite.

The prepared silica wet gel composite was left in an ammonia solution at a temperature of 70° C. for 1 hour to be aged.

Thereafter, a surface modifier solution prepared by mixing hexamethyldisilazane and ethanol in a volume ratio of 1:19 was added to wet gel at 90 vol %, and then surface-modification was performed thereon at 70° C. for 4 hours to prepare a hydrophobic silica wet gel composite. The hydrophobic silica wet gel composite was placed in a supercritical extractor of 7.2 L and $CO_2$ was injected thereto. Thereafter, the temperature inside the extractor was raised to 60° C. over 1 hour, and supercritical drying was performed at 50° C. and 100 bar. At this time, supercritical waste liquid was recovered through a lower end of a separator.

100 g of the recovered supercritical waste liquid was added with sulfuric acid for 10 to 20 minutes such that the pH of recycled supercritical waste liquid is 4.0, and stirred for 2 hours, followed by centrifugation at 3000 rpm for 15 minutes. After the centrifugation, clean supernatant liquid was taken to complete the recycling of the supercritical waste liquid.

The supernatant liquid was reused for producing a next batch of silica sol. Specifically, the supernatant liquid was used as much as 70 wt % of ethanol used for producing silica sol, and fresh ethanol to be used for the first time was used for the remaining 30 wt % to produce a silica aerogel blanket.

Examples 8 to 16

A silica aerogel blanket was produced in the same manner as in Example 7 except that the occurrence of stirring/holding and the rate and time of centrifugation were as described in Table 1 below.

Comparative Example 1

A silica aerogel blanket was produced in the same manner as in Example 1 except that fresh ethanol to be used for the first time was used for producing a silica aerogel blanket instead of recycling the supercritical waste liquid.

Comparative Examples 2 to 3

A silica aerogel blanket was produced in the same manner as in Example 1 except that acetic acid and hydrochloric acid were respectively added in an amount described in Table 1 below instead of sulfuric acid.

TABLE 1

| | Type of added acid | pH of recycled supercritical waste liquid | Additional operating conditions after addition of sulfuric acid (hrs: hour) | Precipitation method (hrs: hour, min: minute) |
|---|---|---|---|---|
| Example 1 | Sulfuric acid | 8.6 | — | Natural precipitation 12 hrs |
| Example 2 | | 8.5 | — | |
| Example 3 | | 8.2 | — | |
| Example 4 | | 4.1 | — | |
| Example 5 | | 3.2 | — | |
| Example 6 | | 2.7 | — | |
| Example 7 | | 4.0 | Stirring 2 hrs | Centrifugation 3000 rpm, 15 min |
| Example 8 | | 4.0 | Stirring 6 hrs | |
| Example 9 | | 4.0 | Stirring 12 hrs | |
| Example 10 | | 4.0 | Holding 2 hrs | Centrifugation 3000 rpm, 15 min |
| Example 11 | | 4.0 | Holding 6 hrs | |
| Example 12 | | 4.0 | Holding 12 hrs | |
| Example 13 | | 4.0 | Stirring 2 hrs | Centrifugation 2000 rpm, 15 min |
| Example 14 | | 4.0 | | Centrifugation 3500 rpm, 15 min |
| Example 15 | | 4.0 | | Centrifugation 3000 rpm, 10 min |
| Example 16 | | 4.0 | | Centrifugation 3000 rpm, 20 min |
| Comparative Example 1 | — | — (No recycling) | — | — |
| Comparative Example 2 | Acetic acid | 6.5 | — | Natural precipitation 12 hrs |
| Comparative Example 3 | Hydrochloric acid | 2.0 | — | |

Experimental Example

The physical properties of each of the silica aerogel blankets of Example 1 to Example 16 and Comparative Examples 1 to Comparative Example 3 were measured, and the results are shown in Table 2 below.

1) BET Surface Area ($m^2/g$), Average Pore Size (Nm), Average Pore Volume ($Cm^3/g$)

The silica aerogel blankets produced in each of the Examples and Comparative Examples were analyzed from the adsorption amount and desorption amount of nitrogen gas adsorbed according to partial pressure ($0.01<p/p0<1$) using ASAP 2010 of Micrometrics Co.

2) Thickness and Thermal Conductivity (mW/mK, 25° C.)

The thickness and room temperature thermal conductivity of the silica aerogel blankets produced in each of the Examples and Comparative Examples were measured using HFM 436 Lambda of NETZSCH Co.

3) Measurement of Silica Sol Gelation Time (without Catalyst)

In each of the Examples and Comparative Examples, gelation time was measured without adding a gelation catalyst. The gelation time was determined based on a point of time at which there was no change in the shape of silica sol when a vessel containing the silica sol was turned over. The longer the time for gelation without a gelation catalyst, the better the storage stability of the silica sol and the easier for long-term storage.

4) Recovery Rate (%) of Recycled Supercritical Waste Liquid (%)

The recovery rate (%, by weight) of recycled supercritical waste liquid of each of the Examples and the Comparative Examples was calculated by the following formula.

Recovery rate (%) of recycled supercritical waste liquid=(weight of solution obtained after precipitating and removing insoluble salt contained in supercritical waste liquid)/(weight of supercritical waste liquid before recycling)×100.

TABLE 2

|  | BET surface area (m²/g) | Average pore size (nm) | Average pore volume (cm³/g) | Thickness (mm) | Thermal conductivity (mW/mK) | Silica sol gelation time (without catalyst, hr) | Recovery rate (%) of recycled supercritical waste liquid |
| --- | --- | --- | --- | --- | --- | --- | --- |
| Example 1 | 788 | 10.9 | 3.0 | 10.7 | 18.9 | ~1 hr | 90 |
| Example 2 | 811 | 10.1 | 2.9 | 10.5 | 18.7 | ~2 hrs | 85 |
| Example 3 | 816 | 10.8 | 3.1 | 10.4 | 17.8 | ~3 hrs | 85 |
| Example 4 | 825 | 10.5 | 3.2 | 10.5 | 17.6 | >24 hrs | 80 |
| Example 5 | 809 | 10.6 | 3.0 | 10.4 | 18.1 | >24 hrs | 80 |
| Example 6 | 789 | 11.6 | 2.9 | 10.6 | 18.8 | >24 hrs | 80 |
| Example 7 | 791 | 10.7 | 2.9 | 10.3 | 18.4 | >24 hrs | 100 |
| Example 8 | 810 | 11.0 | 2.9 | 10.1 | 18.3 | >24 hrs | 100 |
| Example 9 | 805 | 10.9 | 3.0 | 10.3 | 18.1 | >24 hrs | 100 |
| Example 10 | 610 | 13.4 | 2.0 | 10.2 | 19.1 | >24 hrs | 100 |
| Example 11 | 742 | 13.1 | 2.5 | 10.0 | 18.4 | >24 hrs | 100 |
| Example 12 | 796 | 11.2 | 2.9 | 10.3 | 18.2 | >24 hrs | 100 |
| Example 13 | 620 | 13.5 | 2.1 | 10.2 | 19.0 | >24 hrs | 100 |
| Example 14 | 809 | 10.8 | 3.0 | 10.2 | 18.3 | >24 hrs | 100 |
| Example 15 | 720 | 13.2 | 2.3 | 10.4 | 18.7 | >24 hrs | 100 |
| Example 16 | 799 | 10.3 | 3.1 | 10.2 | 18.4 | >24 hrs | 100 |
| Comparative Example 1 | 764 | 11.0 | 3.1 | 10.4 | 18.3 | >24 hrs | — |
| Comparative Example 2 | 791 | 11.5 | 2.8 | 10.2 | 21.5 | >24 hrs | —(No generation of insoluble salt) |
| Comparative Example 3 | 806 | 14.2 | 3.3 | 10.6 | 20.1 | >24 hrs | —(No generation of insoluble salt) |

Figure 3:
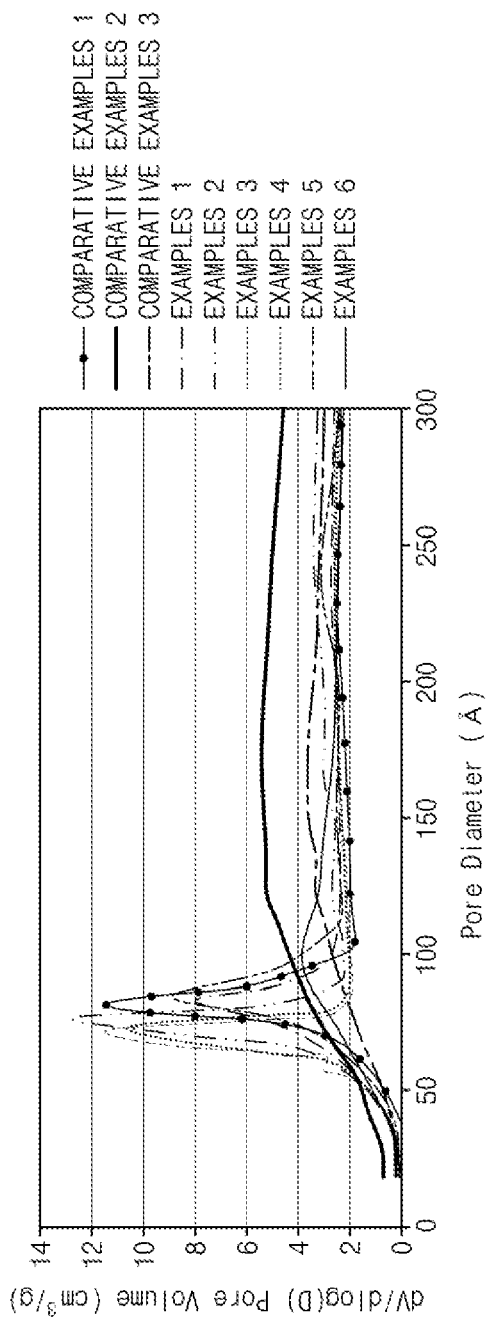
FIG. 3 is a graph showing pore size distribution of silica aerosol in silica aerogel blankets according to Examples 1 to 6 and Comparative Examples 1 to 3 of the present invention.
Figure 4:
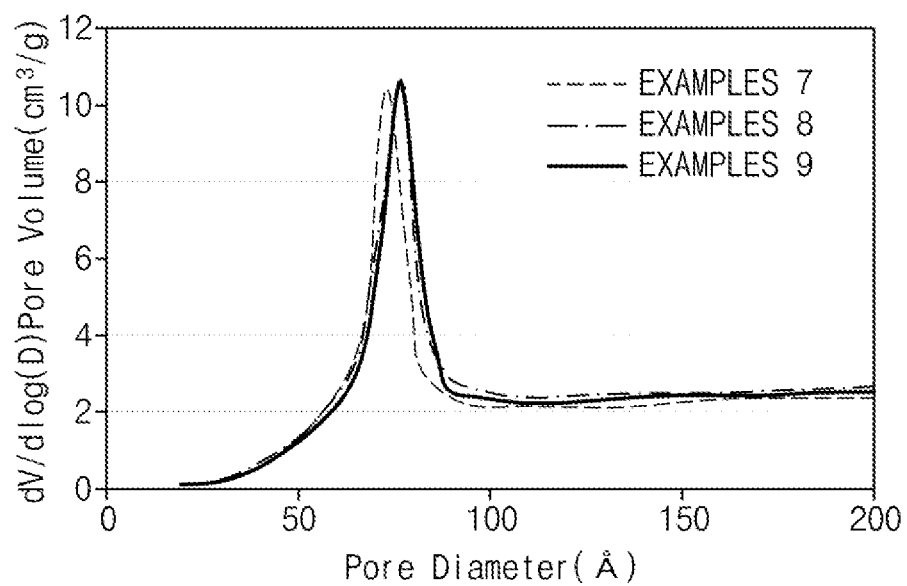
FIG. 4 is a graph showing pore size distribution of silica aerosol in silica aerogel blankets according to Examples 7 to 9 of the present invention.

As shown in Table 2, FIG. 3 and FIG. 4, it can be confirmed that a silica aerogel blanket produced by reusing supercritical waste liquid recycled by adding an appropriate amount of sulfuric acid to recovered supercritical waste liquid has pores having an average pore size, a large average pore volume and a relatively uniform pore size, and has a large BET specific surface area and excellent thermal insulation performance.

The result was the same or similar to that of a silica aerogel blanket of Comparative Example 1 using only fresh ethanol to be used for the first time instead of reusing supercritical waste liquid.

Also, FIG. 3 and FIG. 4 are distribution graphs of pore diameters which show that the distribution graphs of Examples 1 to 6 of FIG. 3 and the distribution graphs of Examples 7 to 9 of FIG. 4 are narrower and higher than the distribution graphs of Comparative Examples 1 to 3 of FIG. 3. Through FIG. 3 and FIG. 4, it can be confirmed that Examples have pores having a relatively uniform size when compared with Comparative Examples.

Also, among Examples 1 to 6 in which supercritical waste liquid is recycled in the same manner, Examples 4 and 5 in which the pH of the recycled supercritical waste liquid is 3.0-5.0 exhibit excellent physical properties and excellent thermal insulation performance.

Furthermore, Examples 6 to 16 in which a separate process such as stirring and/or centrifugation is further performed after the addition of sulfuric acid have a significantly high recovery rate of the recycled supercritical waste liquid, and since the precipitation time was greatly reduced, the efficiency of the entire process can be increased.

In addition, Comparative Examples 2 to 3 in which acetic acid and hydrochloric acid were respectively used instead of sulfuric acid have a significantly lower pore uniformity than Examples (see FIG. 3), and also have a high thermal conductivity so that the thermal insulation performance thereof is not good.

As such, when supercritical waste liquid recycled according to the present invention is reused, it is possible to produce a silica aerogel blanket whose production costs are reduced, physical properties are prevented from being deteriorated, and thermal insulation performance is excellent.

The foregoing description of the present invention has been presented for purposes of illustration. It will be understood by those skilled in the art that various changes in form and details can be made therein without departing from the spirit and scope of the invention. It is therefore to be understood that the above-described embodiments are illustrative in all aspects and not restrictive.

The invention claimed is:

1. A method for recycling supercritical waste liquid, comprising:

adding sulfuric acid to a supercritical waste liquid generated in a supercritical drying step during a process of producing a silica aerogel blanket, wherein the supercritical waste liquid comprises ammonium ions ($NH_4^+$);
precipitating and removing an insoluble salt produced by adding the sulfuric acid to yield a recycled supercritical waste liquid; and
using the recycled supercritical waste liquid to replace at least a portion of an organic solvent in one or more steps in the process of producing a silica aerogel blanket.

2. The method of claim 1, wherein the supercritical waste liquid further comprises water and an organic solvent.

3. The method of claim 2, wherein the organic solvent is one or more selected from the group consisting of methanol, ethanol, hexane, and pentane.

4. The method of claim 1, wherein the sulfuric acid is added such that the pH of the supercritical waste liquid is 2.5 to 9.0.

5. The method of claim 1, wherein the sulfuric acid is added such that the pH of the supercritical waste liquid is 3.0 to 5.0.

6. The method of claim 1, wherein the insoluble salt is ammonium sulfate.

7. The method of claim 1, further comprising:
performing centrifugation on the supercritical waste liquid after adding the sulfuric acid; and
collecting a supernatant liquid after the centrifugation as a recycled supercritical waste liquid.

8. The method of claim 7, wherein the centrifugation is performed at a rate of 2000 to 3500 rpm for 10 to 30 minutes.

9. The method of claim 7, further comprising, before the centrifugation, stirring the supercritical waste liquid after adding the sulfuric acid, wherein the stirring time is 1 to 6 hours.

10. The method of claim 7, further comprising, before the centrifugation, holding the supercritical waste liquid after adding the sulfuric acid, wherein the holding time is 5 to 7 hours.

11. The method of claim 7, wherein the total process time of the method for recycling the supercritical waste liquid is 10 hours or less.

12. The method of claim 1, wherein the recovery rate of the recycled supercritical waste liquid is 80% or greater based on the weight of the supercritical waste liquid before the addition of the sulfuric acid.

13. The method of claim 1, wherein the supercritical waste liquid is obtained by simultaneously applying a plurality of pressure pulses to a solvent contained in a silica gel and supercritical fluid in the supercritical drying step, and at least two of the plurality of pressure pulses have at least one feature of being different frequencies and being different amplitudes.

14. The method of claim 1, wherein the recycled supercritical waste liquid is used in an amount of 85 wt % or greater based on the total weight of the organic solvent used for producing the silica aerogel blanket.

15. A method for producing a silica aerogel blanket, comprising:
preparing a silica sol;
impregnating a fibrous blanket with the silica sol;
gelling the silica sol to form a silica aerogel;
aging the silica aerogel;
surface modifying the silica aerogel; and
drying the silica aerogel to yield the silica aerogel blanket,
wherein a recycled supercritical waste liquid prepared by the method of claim 1 is used in one or more of the steps.

16. The method of claim 15, wherein the recycled supercritical waste liquid is used in one or more steps selected from the group consisting of the silica sol preparation step, the aging step, and the surface modification step.

17. The method of claim 16, wherein the recycled supercritical waste liquid is used in preparing the silica sol, and an amount of the recycled supercritical waste liquid used in the silica sol preparation step is 55 wt % to 100 wt % based on the total weight of the organic solvent used in the silica sol preparation step.

18. The method of claim 15, wherein the recycled supercritical waste liquid is used in an amount of 85 wt % or greater based on the total weight of the organic solvent used for producing the silica aerogel blanket.

19. The method of claim 15, wherein the thermal conductivity of the silica aerogel blanket is 20 mW/mK or less.

* * * * *